(12) United States Patent
Tseng et al.

(10) Patent No.: US 8,770,365 B2
(45) Date of Patent: Jul. 8, 2014

(54) FRICTION DAMPER FOR A TRANSMISSION CLUTCH

(75) Inventors: Jau-Wen Tseng, Ann Arbor, MI (US);
Carl P. Garbacik, Northville, MI (US);
Michael A. Brockway, Pinckney, MI (US); Kent E. Flory, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/603,626

(22) Filed: Sep. 5, 2012

(65) Prior Publication Data

US 2014/0060993 A1  Mar. 6, 2014

(51) Int. Cl.
*F16D 25/0638* (2006.01)
*F16D 3/14* (2006.01)
*F16F 15/129* (2006.01)

(52) U.S. Cl.
USPC ............... 192/30 V; 192/70.12; 192/85.24

(58) Field of Classification Search
USPC .................... 192/30 V, 70.17, 207
See application file for complete search history.

(56) References Cited

U.S. PATENT DOCUMENTS

| | | | |
|---|---|---|---|
| 2,714,823 A | 8/1955 | Dall et al. | |
| 4,171,147 A | 10/1979 | Swisher, Jr. et al. | |
| 4,458,793 A * | 7/1984 | Riese et al. | 192/12 A |
| 6,089,121 A | 7/2000 | Lohaus | |
| 7,163,095 B2 | 1/2007 | Springer et al. | |
| 7,478,709 B2 | 1/2009 | Haka et al. | |
| 2009/0050437 A1 * | 2/2009 | Fujita | 192/85 F |

* cited by examiner

*Primary Examiner* — Richard M. Lorence
(74) *Attorney, Agent, or Firm* — James Dottavio; MacMillan, Sobanski & Todd, LLC

(57) ABSTRACT

A clutch assembly includes a hub rotatable about an axis and at least partially surrounding a cavity, a damper ring within the cavity, able to revolve about the axis, rotatable relative to the hub, a spring, a friction disc, forced elastically by the spring into contact with the damper ring, and a second friction disc contacting the damper ring and providing a reaction to the force of the spring.

14 Claims, 3 Drawing Sheets

FRICTION DAMPER FOR A TRANSMISSION CLUTCH

BACKGROUND OF THE INVENTION

1. Field of the Invention

This invention relates generally to a friction damper for an automatic transmission clutch hub.

2. Description of the Prior Art

During normal operating mode of an automatic transmission for a motor vehicle, vehicle occupants may hear and feel an objectionable noise and vibration, transmitted through a clutch hub that is connected by splines to the friction plates of the clutch.

The noise is generated by torsional vibration from the stick slip of the friction clutch during engagements and disengagements while the automatic transmission is producing a gear change. Shifting from a current gear to a new gear usually involves disengaging a clutch, whose engagement is required to produce the current gear ratio, and engaging a second clutch, whose engagement is required to produce the new gear. Engagement and disengagement of a clutch may result in self-excitation of the clutch as the clutch slips.

SUMMARY OF THE INVENTION

A clutch assembly includes a hub rotatable about an axis and at least partially surrounding a cavity, a damper ring within the cavity, able to revolve about the axis, rotatable relative to the hub, a spring, a friction disc, forced elastically by the spring into contact with the damper ring, and a second friction disc contacting the damper ring and providing a reaction to the force of the spring.

The mass of the damper ring rotates relative to the clutch hub during the clutch hub rotational vibration. The friction damper, which is integrated into the clutch hub, reduces the hub vibration by cancelling the resonant vibration.

The friction damper does not use the clutch hub as a friction surface, but uses conventional friction plates as the damper friction elements and the mass as a friction surface.

After the friction damper is assembled into the clutch hub, the clutch hub is pressed onto a shaft, without disassembling the damper.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
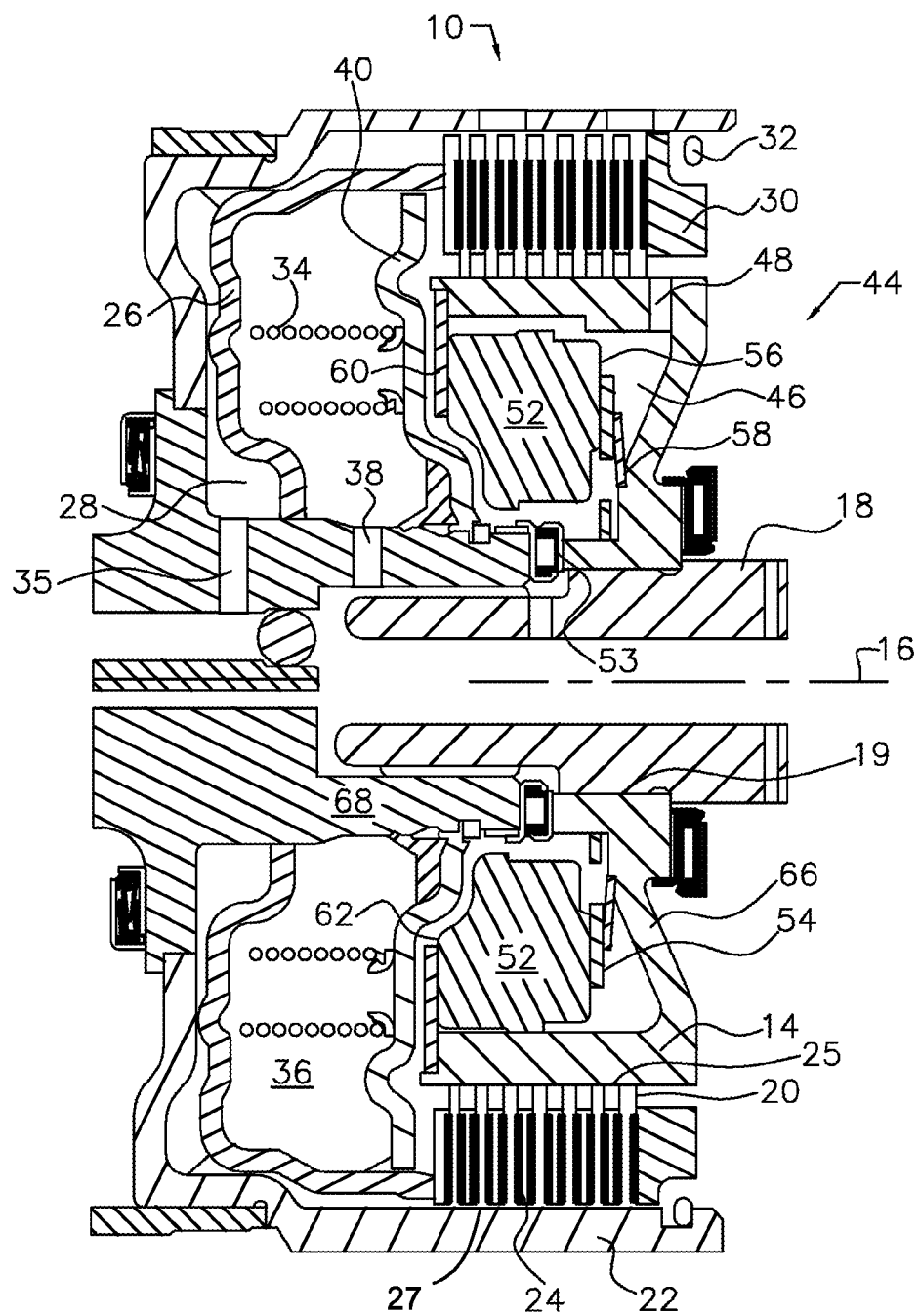
FIG. 1 is a cross sectional view of a friction clutch assembly installed in an automatic transmission for a motor vehicle.
Figure 2:
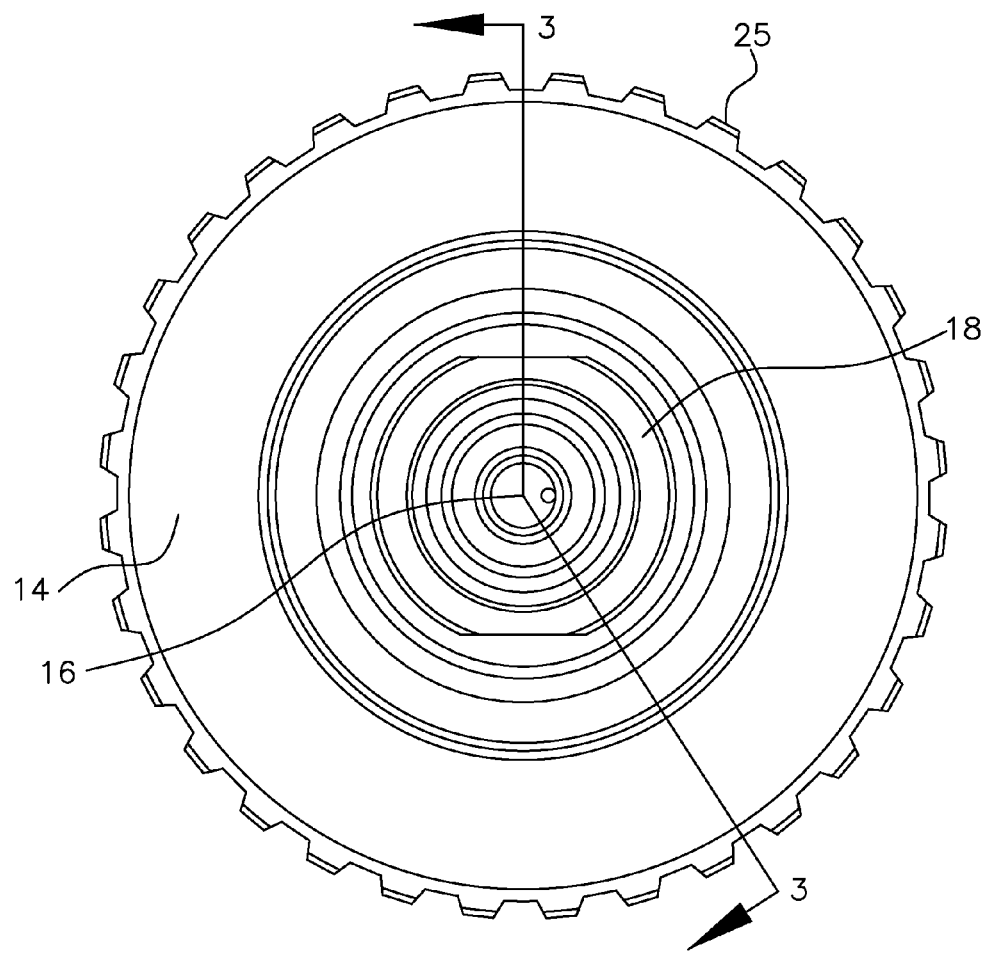
FIG. 2 is side view of the clutch hub of FIG. 1.
Figure 3:
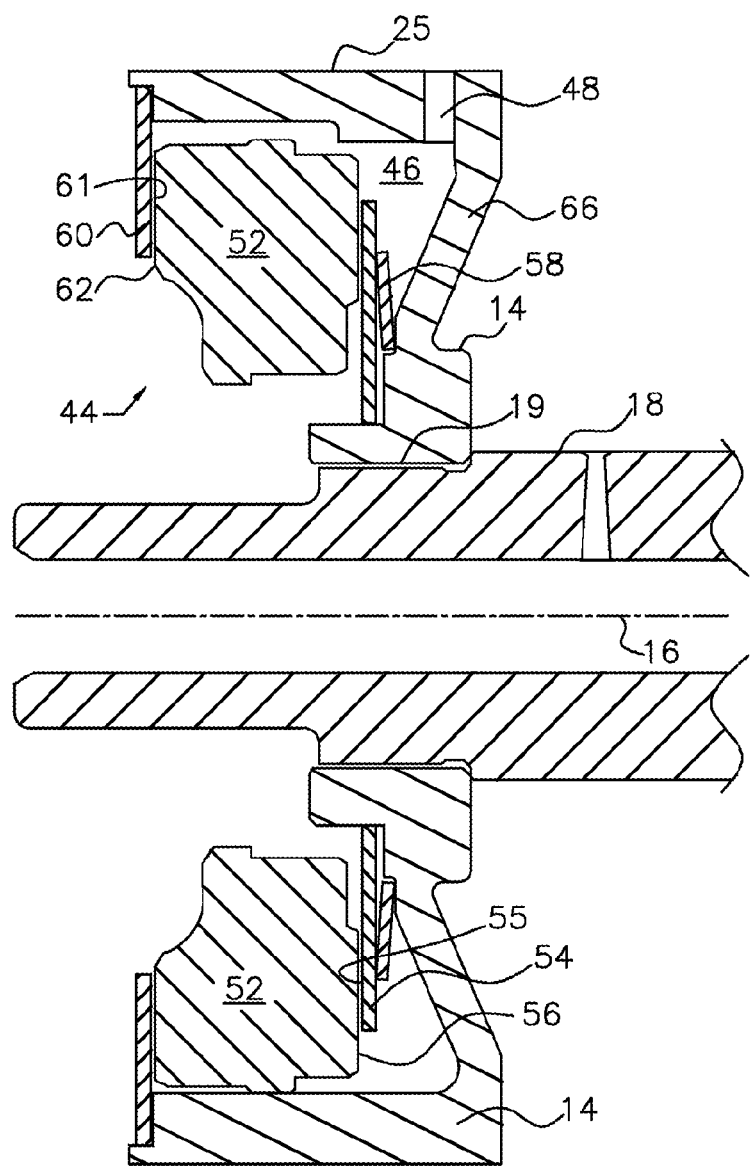
FIG. 3 is a cross sectional view of the friction damper assembly of FIG. 1.

A clutch assembly 10 and the related components of a vehicle automatic transmission, as illustrated in FIG. 1, include a clutch hub 14, which revolves about axis 16 on a shaft 18 secured by a spline 19 to the hub. Each of a set of friction discs 20 of clutch 10 is secured to the hub 14 by an axial spline 25. Each of a set of spacer plates 24, interleaved between the friction discs 20, is secured to the radial inner surface of a shell 22 by an axial spline 27. A clutch piston 26 is supported for axial displacement. Piston 26 is actuated by hydraulic pressure in a sealed cylinder 28 to move rightward, thereby forcing the friction discs 20 and spacer plates 24 into mutual frictional contact against a backing plate 30, which is fixed against displacement on shell 22 by a snap ring 32. A helical spring 34 continually urges the piston 26 leftward. Pressurized hydraulic fluid is supplied to cylinder 28 through a radial passage 35.

A volume 36, filled with hydraulic fluid through radial passage 38, is closed at the right-hand side of volume 36 and sealed there by a balance dam 40.

A clutch damper 44 includes an annular damper ring 52 located in a cavity 46. Hydraulic fluid is supplied through a bearing 53, through the interface between the friction disc 54 and the damper ring 52, cavity 46, a series of radial holes 48 in hub 14, to the friction discs 20 of clutch 10. The clutch damper 44 revolves about axis 16 as clutch hub 14 rotates about axis 16. A friction disc 54, located at the right-hand side of damper ring 52, includes friction material 55, which is urged elastically leftward into contact with the axial face 56 of damper ring 52 by the elastic force of a Belleville spring 58, located axially between clutch hub 14 and friction disc 54. A second friction disc 60, which includes friction material 61 contacting the left-hand axial face 62 of damper ring 52, is secured to clutch hub 14.

Damper ring 52 is located in annular cavity 46, bounded axially by balance dam 40 and the radial portion 66 of hub 14, and bounded radially by clutch hub 14 and the axial portion 68 of shell 22. Preferably damper ring 52 is formed of solid metal.

Hydraulic fluid in cavity 46 is directed between the friction material 55 on friction disc 54 at the right-hand axial face 56 of the damper ring 52 and between the friction material 61 on the second friction disc 60 at the left-hand axial face 62 of the damper ring 52.

Damper ring 52 revolves about axis 16 and rotates relative to clutch hub 14 while rotational vibration is produced in the clutch assembly 10. Relative movement between the axial face 56 of damper ring 52 and friction disc 54 and between the axial face 62 of damper ring 52 and second friction disc 60 dissipates energy through friction, thereby minimizing vibration in the clutch assembly 10 and reducing noise. The friction damper ring 52 reduces vibration of the clutch hub 14 by cancelling resonant vibration.

The damper ring 52 is integrated into the clutch hub 14 using a unique fastening technique whereby, after the friction damper is assembled into the clutch hub 14, the clutch hub is pressed onto shaft 18 without disassembling the damper.

In accordance with the provisions of the patent statutes, the preferred embodiment has been described. However, it should be noted that the alternate embodiments can be practiced otherwise than as specifically illustrated and described.

The invention claimed is:

1. A clutch comprising:
    a hub rotatable about an axis, having a radially extending arm and an axially extending arm at least partially surrounding a cavity;
    a damper ring within the cavity, radially inward from the axially extending arm, able to revolve about the axis, rotatable relative to the hub;
    a spring contacting the hub;

a first friction disc adjacent to but spaced axially from the radially extending arm, forced elastically by the spring away from the radially extending arm into contact with the damper ring, and rotatable relative to the damper ring;

a second friction disc contacting and rotatable relative to the damper ring and providing a reaction to a force produced by the spring.

2. The clutch of claim 1, wherein the first friction disc is located axially between the damper ring and hub.

3. The clutch of claim 1, wherein the first friction disc is urged by the spring axially into contact with the damper ring.

4. The clutch of claim 1, wherein the second friction disc is secured to the hub against displacement.

5. The clutch of claim 1, wherein the cavity is supplied with hydraulic fluid admitted between the first friction disc and the damper ring and between the second friction disc and the damper ring.

6. The clutch of claim 1, wherein the first friction disc includes friction material contacting the damper ring, and the second friction disc includes second friction material contacting the damper ring.

7. The clutch of claim 1, further comprising:

a clutch shell;

a set of friction plates and a set of spacer plates, both sets located radially outboard of the damper ring, for alternately driveably connecting the shell and the hub when the clutch is engaged and driveably disconnecting the shell and the hub when the clutch is disengaged.

8. A clutch comprising:

a hub rotatable about an axis, having a radially extending arm and an axially extending arm at least partially surrounding a cavity;

a damper ring within the cavity, radially inward from the axially extending arm, able to revolve about the axis, rotatable relative to the hub;

a spring;

a first friction disc spaced axially from the radially extending arm forced by the spring away from the radially extending arm against a first axial side of the ring, and rotatable relative to the damper ring;

a second friction disc contacting and rotatable relative to the ring at a second axial side of the ring with a reaction to a force produced by the spring.

9. The clutch of claim 8, wherein the second friction disc secured against axial displacement.

10. The clutch of claim 8, wherein the first friction disc is located axially between the ring and hub.

11. The clutch of claim 8, wherein the first friction disc is urged by the spring axially into elastic contact with the ring.

12. The clutch of claim 8, wherein the cavity is supplied with hydraulic fluid that passes between the first friction disc and the ring and between the second friction disc and the ring.

13. The clutch of claim 8, wherein the first friction disc includes friction material contacting the ring, and the second friction disc includes second friction material contacting the ring.

14. The clutch of claim 8, further comprising:

a clutch shell;

a set of friction plates and a set of spacer plates, both sets located radially outboard of the ring, for alternately driveably connecting the shell and the hub when the clutch is engaged and driveably disconnecting the shell and the hub when the clutch is disengaged.

* * * * *